US005607526A

United States Patent [19]

Buckley

[11] Patent Number: 5,607,526

[45] Date of Patent: Mar. 4, 1997

[54] LABEL-APPLYING METHOD AND APPARATUS

[75] Inventor: William M. Buckley, Saunderton, Great Britain

[73] Assignee: Molins PLC, Milton Keynes, United Kingdom

[21] Appl. No.: 378,573

[22] Filed: Jan. 26, 1995

[30] Foreign Application Priority Data

Jan. 26, 1994 [GB] United Kingdom .................. 9401441

[51] Int. Cl.$^{6}$ .................................. B32B 31/00

[52] U.S. Cl. ......................... 156/64; 156/352; 156/362; 156/517; 156/521; 156/DIG. 4

[58] Field of Search ........................ 156/64, 350, 352, 156/356, 362, 368, 517, 521, DIG. 4, DIG. 29, DIG. 31

[56] References Cited

U.S. PATENT DOCUMENTS

| | | | |
|---|---|---|---|
| 3,989,574 | 11/1976 | Evans | 156/352 X |
| 4,620,888 | 11/1986 | Easter et al. | 156/352 X |
| 4,620,891 | 11/1986 | Applegate et al. | 156/568 X |
| 4,724,029 | 2/1988 | Kontz | 156/521 X |
| 4,784,714 | 11/1988 | Shibata | 156/521 X |
| 4,885,895 | 12/1989 | Focke et al. | 53/73 |
| 4,985,096 | 1/1991 | Bekker-Madsen | 156/521 X |
| 5,188,687 | 2/1993 | Baum | 156/352 X |

*Primary Examiner*—David A. Simmons
*Assistant Examiner*—Paul M. Rivard
*Attorney, Agent, or Firm*—Antonelli, Terry, Stout & Kraus, LLP

[57] ABSTRACT

Label applying apparatus (e.g. a stamper) includes a system for advancing articles (18B) with labels applied to them to a stabilising region (32) following a signal to interrupt operation of the apparatus. This, together with means for inhibiting further feed of labels to the adhesive applicator (16), prevents unnecessary waste of labels and/or articles. The apparatus includes a pinch roller (42) carried by a knife drum (12) arranged to sever successive leading ends of a web (2) of label material to form individual labels, the roller cooperating with a suction drum (14) to ensure reliable separation and transfer of successive labels.

26 Claims, 5 Drawing Sheets

LABEL-APPLYING METHOD AND APPARATUS

Figure 1:
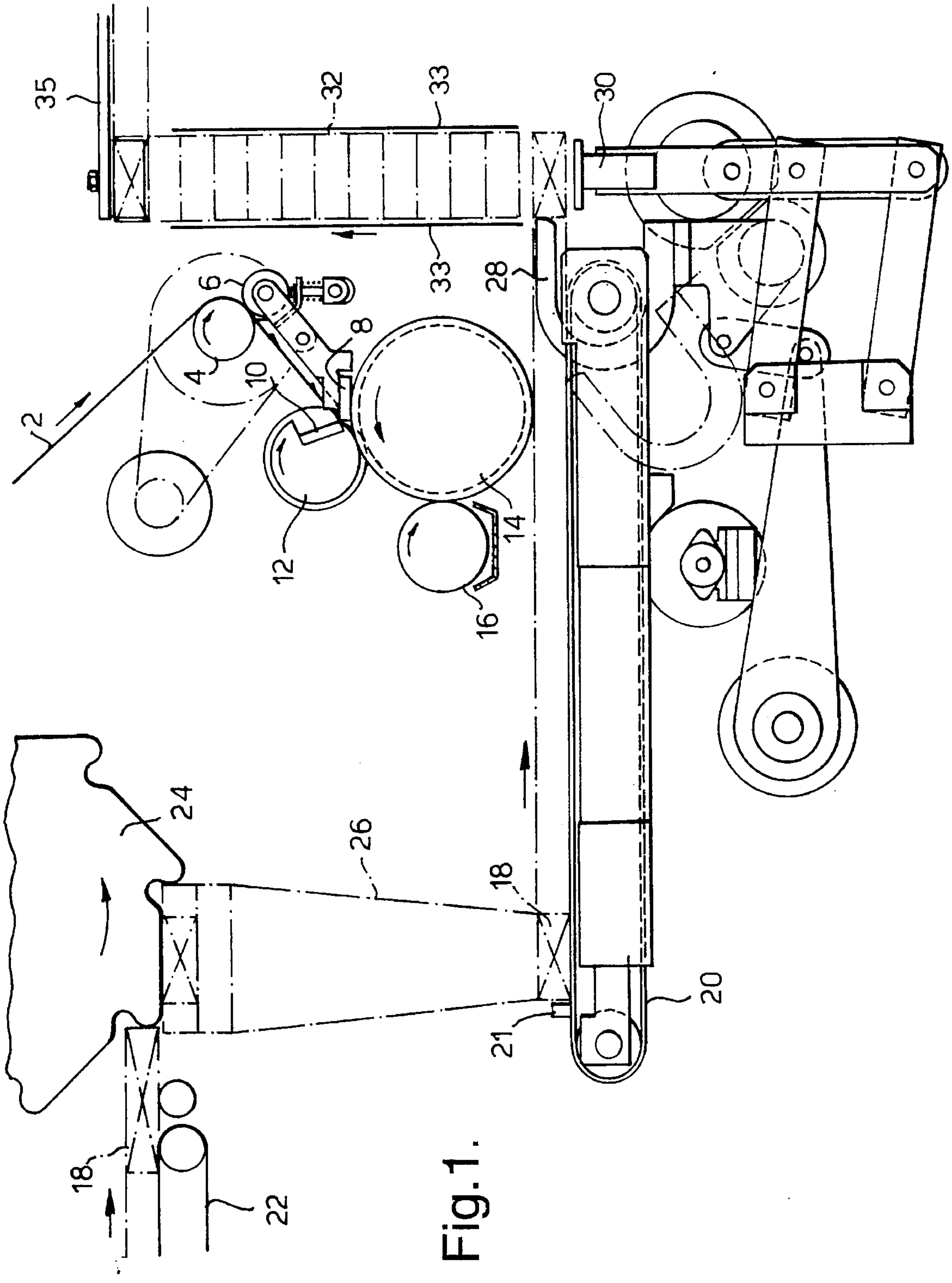

This invention relates to a label-applying method and apparatus, particularly for applying labels such as revenue stamps to cigarette packets.

It is known to provide apparatus for applying labels such as revenue stamps to cigarette packets as part of a production line of apparatus including a packing machine, in which groups of cigarettes are packed in packets, and a wrapping machine, in which the packets are overwrapped, usually in transparent wrapping film.

Such apparatus may be provided as an integral part of one of the machines forming the production line, e.g. the wrapping machine, or may be provided as a stand-alone unit. In either case feed or delivery of packets may be temporarily interrupted, requiring corresponding temporary interruption of the operation of the apparatus. In some known types of label applying apparatus such temporary interruption can result in wastage of labels on which adhesive has already been applied before the interruption and/or production of packets with poorly affixed labels. If not attended to by an operator the consequence of this may be not only wastage of materials but also subsequent malfunction of the apparatus or even of a downstream machine.

According to one aspect of the invention a method of applying labels to articles (particularly packets) includes the process steps of feeding adhesive-carrying labels at a first position, conveying labels from said first position through an intermediate region in which successive labels are applied to successive articles, and delivering articles with applied labels to a stabilising region downstream of said intermediate region, wherein, following a signal to interrupt the process steps, at least one article carrying an applied label is moved from said intermediate region to said stabilising region while further feed of labels at said first position is inhibited, and after a predetermined period following said signal no labels with adhesive applied to them remain in said intermediate region. Preferably feed of articles into the intermediate region is also inhibited following said signal. The method preferably includes the step of applying adhesive to or activating adhesive on the labels at said first position, e.g. there may be a gummer at said first position, or a heater for reactivating hot-melt adhesive carried by the labels. The term "label" as used herein includes bands, strips and other wrappers capable of being adhesively secured to an article.

By arranging for packets with labels already applied to them to be advanced to the stabilising region following a signal to interrupt the process steps it is ensured that the labels become securely affixed to such articles. Similarly, by inhibiting further advance of labels past the position at which adhesive is applied it can readily be arranged that no labels are left in the intermediate region with consequent drying out of the adhesive during the interruption. Commonly revenue stamps are applied over adjoining faces of a packet so that after application the stamp is folded around the edge of the packet lying between said faces. The invention is particularly usefully applied in processes involving this two-stage type of application of labels, where packets carrying incompletely applied labels may otherwise remain following a process interruption.

The invention extends also to apparatus for performing the method.

According to another aspect of the invention apparatus for applying labels to articles (particularly packets) comprises means for feeding a web of label material, means for severing successive leading ends of the web to form labels, a suction drum for receiving labels from said severing means and for conveying them towards a station at which the labels are applied to said articles, and a further drum cooperating with said suction drum and carrying periodically operating means for engaging a leading part of each successive label severed from the web and for causing it to be subsequently conveyed on said suction drum in a predetermined position. The periodically operating means may cooperate with said suction drum to grip each label and may comprise a radially-movable wheel carried by said further drum near its periphery. The further drum preferably comprises a rotary knife drum forming part of said severing means. Where the knife drum cooperates with a stationary counter knife cam means or the like may be provided to prevent interference between the periodically operating means and the counter knife.

The different aspects of the invention may be embodied in the same apparatus.

Figure 2:
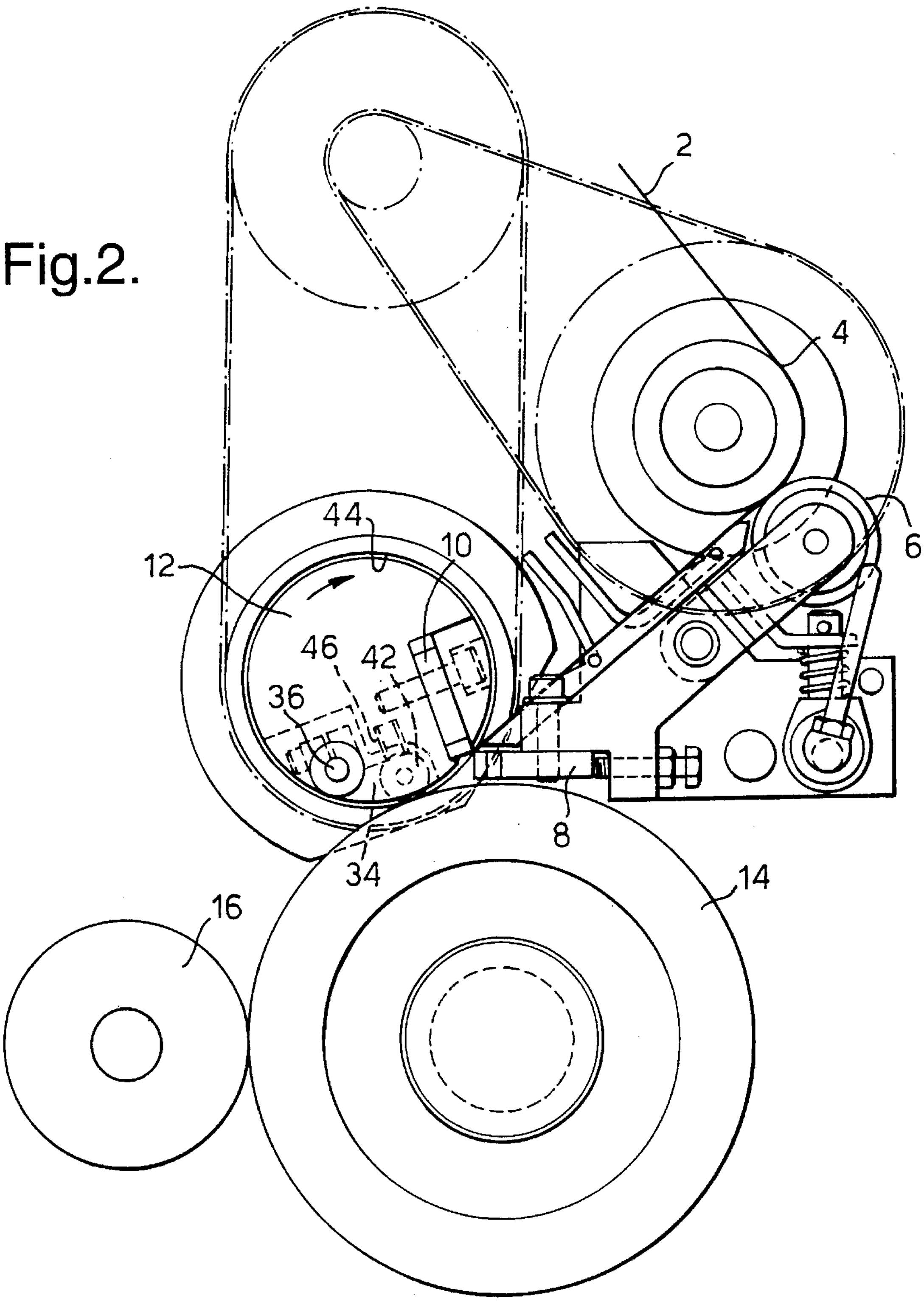
Figure 3:
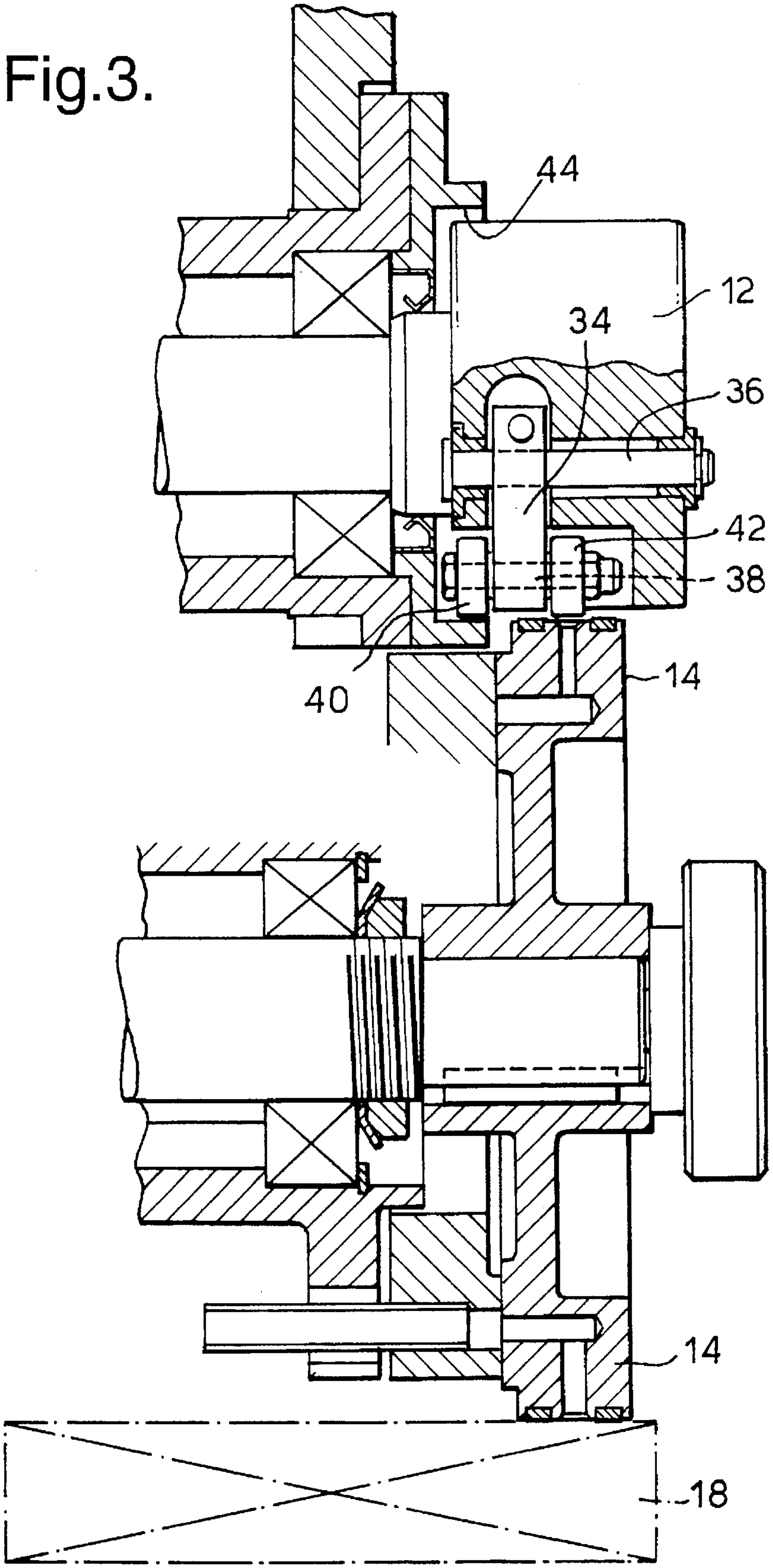
Figure 4:
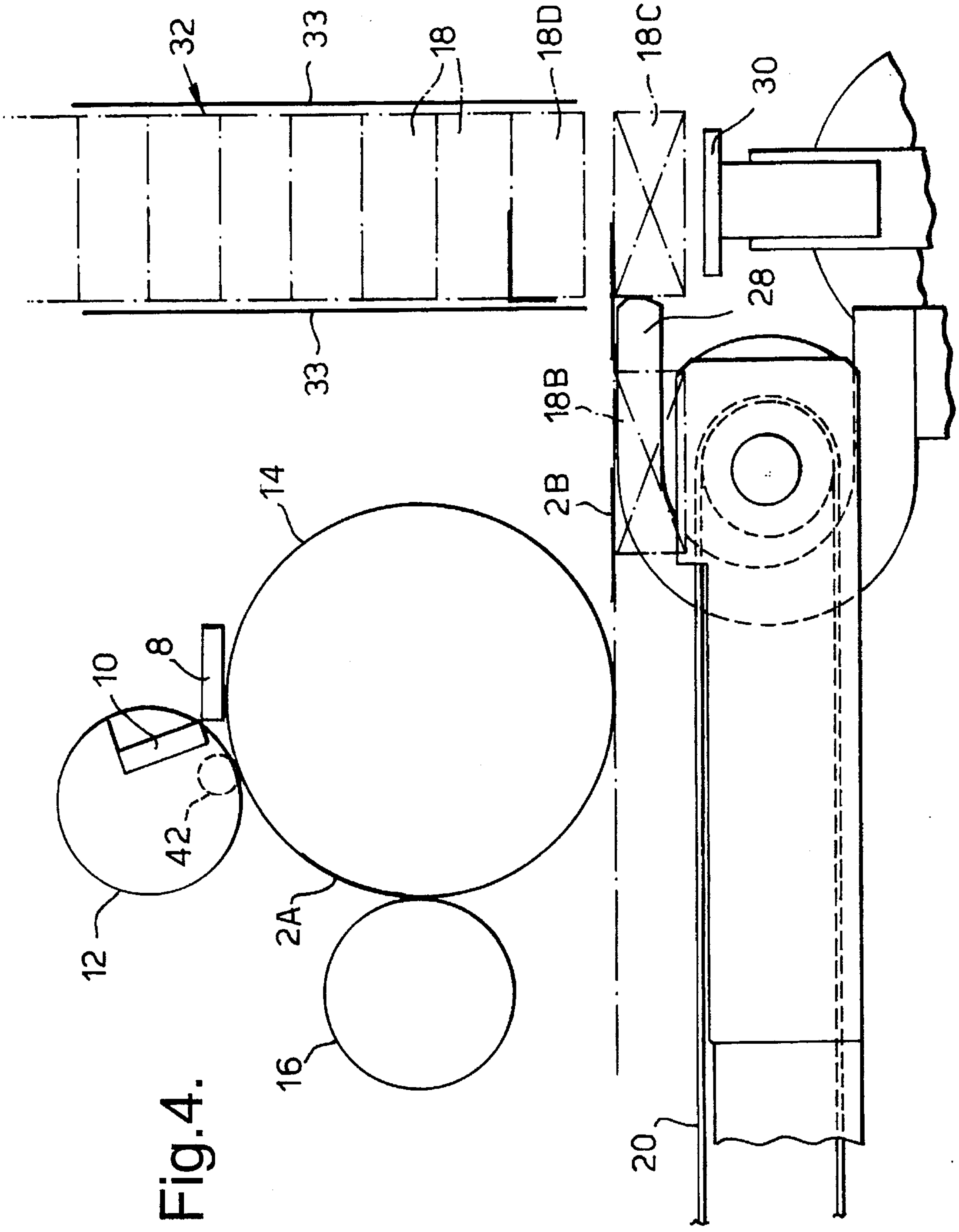
Figure 5:
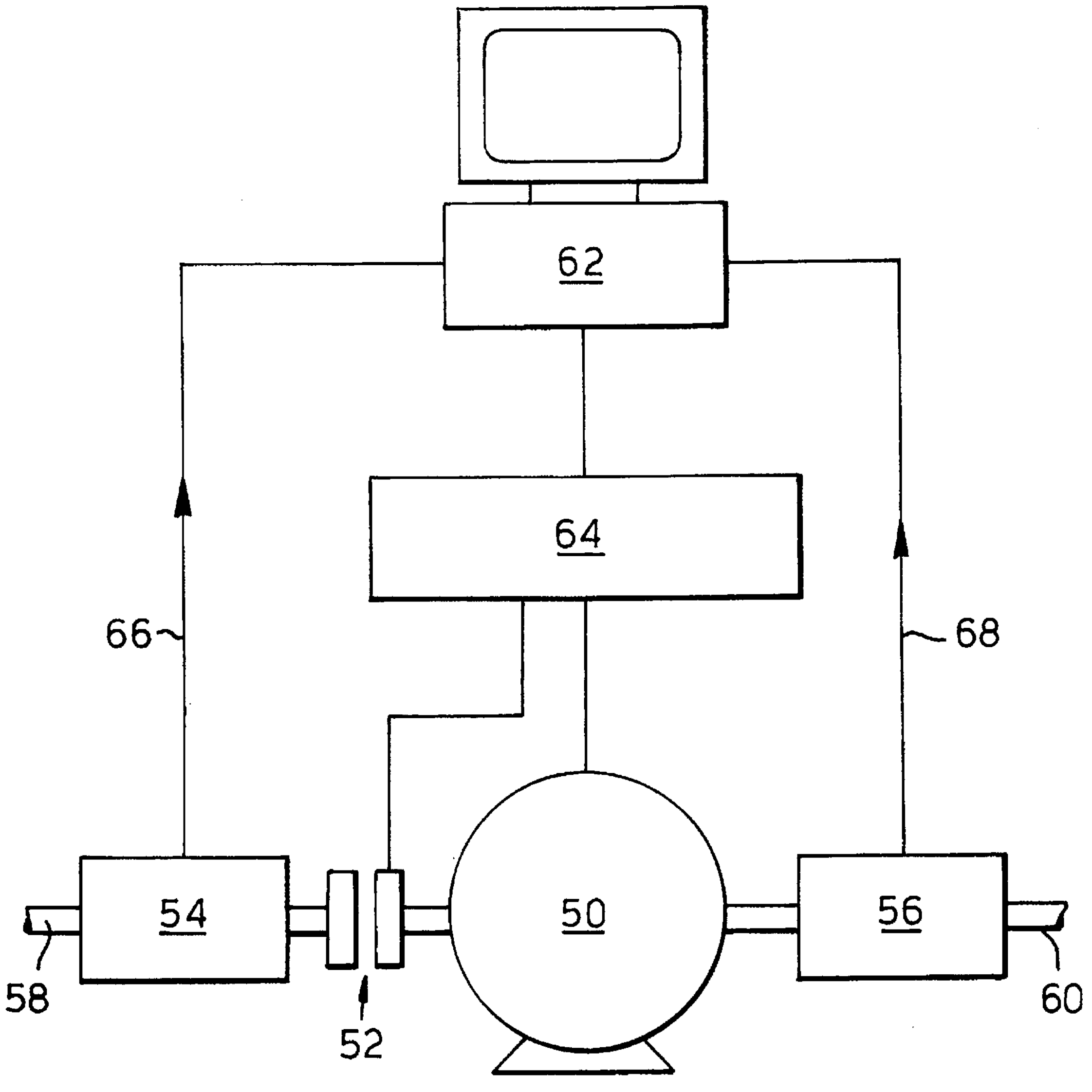

The invention will be further described, by way of example only, with reference to the accompanying diagrammatic drawings, in which:

FIG. 1 is a side view of part of a machine for applying labels such as revenue stamps to cigarette packets, FIG. 2 is an enlarged side view of part of the machine shown in FIG. 1, FIG. 3 is a sectional view of a detail of the machine shown in FIG. 2, FIG. 4 is a further enlarged side view of part of the machine of FIG. 1, and FIG. 5 shows a drive arrangement for the machine.

Referring to FIG. 1, a web 2 of label material is drawn at a controlled speed from a source by a drive roll 4 cooperating with a resiliently-loaded counter roll 6. The web 2 passes from the roll 4 over a stationary knife 8 cooperating with a rotary knife 10 carried on a drum 12. Immediately downstream of the knife 8 is a suction drum 14 which receives individual labels severed from the web 2 and conveys them past a gumming wheel 16 which applies adhesive to the labels. The peripheral speed of the drum 14 is higher than the linear speed of the web 2, so that individual labels become spaced apart. At the bottom of the drum 14 each label is applied to a packet 18 conveyed along a horizontal path by a belt conveyor 20.

Packets 18 are introduced into the machine by way of a further belt conveyor 22 leading into a starwheel 24 which delivers successive packets to the top of a stack of packets in a twisted chute 26 leading down to a position over the upstream end of conveyor 20. The twisted chute 26 serves to reorientate packets 18 delivered into the machine by twisting them through 90° about a vertical axis. Depending on the orientation in which the packets are delivered from the upstream machine and/or the position on the packets at which it is desired to apply the label, the chute 26 may or may not need to include a twist. The conveyor 20 includes pushers 21 for delivering packets 18 at regular intervals from the bottom end of the chute 26 and for conveying them below the drum 14 for application of a label.

At the downstream end of the conveyor 20 a pivoted push member or pecker 28 operates to deliver each successive packet 18 from the end of the conveyor to a position immediately above a lifting plunger 30. In order to allow the pecker 28 to operate across the path of the end of conveyor 20 the pecker and conveyor (including pushers) comprise parts which are mutually laterally spaced. The plunger 30 lifts successive packets 18 (now with labels applied) into a stack 32 formed between guides 33, from which successive uppermost packets are removed for delivery to a downstream machine (e.g. a wrapping machine) by a further pusher 35, rotatable about a vertical axis. The stack 32 serves as a drying reservoir for the labels: the labels are maintained in position on their respective packets while in the stack, by the guides 33 and/or by the adjacent packet(s), and are securely attached by the time the packets are delivered from the top of the stack by the pusher 35.

As shown in FIGS. 2 and 3, the drum 12 which carries the knife 10 also carries a bracket 34 pivoted about a shaft 36 extending parallel to the axis of the drum but at a position close to its periphery. The bracket 34 extends away from the shaft 36 in a direction approximately parallel to the adjacent surface of the drum 12 and carries a spindle 38 at its end remote from the shaft, the spindle itself carrying freely-rotatable wheels 40, 42 on either side of the bracket, as shown in FIG. 3. The bracket 34 is urged by a compression spring 46 housed in a recess in the drum 12 so that the wheel 40 is pressed against an internal annular stationary cam surface 44. The shape of this surface 44 is such that when the drum 12 rotates to a position with the wheel 42 opposite the drum 14 (i.e. the position shown in FIGS. 2 and 3) the wheel 42 is pressed onto the surface of the drum 14 by the spring 46 (i.e. some or all of the pressure of the spring normally resisted by the wheel 40 and surface 44 is now resisted instead by the wheel 42 and drum 14). The surface 44 may simply have a gap at a position corresponding to where it is desired that the wheel 42 press against the drum 14. The wheel 42 is located upstream of the knife 10 relative to the direction of rotation of the drum 12 and is typically spaced from it by a distance along the circumference of the drum which is slightly less than the length of a label to be cut from the web 2. Thus the leading end of each label is engaged between the wheel 42 and drum 14 at the instant it is severed from the web 2 by the action of the knife 10 cooperating with the stationary knife 8. This results in the label being rapidly and reliably accelerated to the speed of the drum 14. Engaging the label positively in this way helps to ensure accurate positioning on the drum 14 so that subsequent positioning on the packets may be similarly accurate. The shape of the cam surface 44 is substantially circular but includes a portion which moves the wheels 40 and 42 in a direction which is radially inwards of the drum 12 in the vicinity of the stationary knife 8, so as to avoid interference between the knife and the wheel 42.

The illustrated machine is equipped with a feature intended to prevent waste, particularly of labels (which may have significant value as revenue stamps). On any signal to stop the machine (other than in an emergency) drive to all moving pads is interrupted so that the machine will stop with labels and packets in arbitrary positions. After a shod delay (in the order of 1–2 seconds) the main drive operates to move the machine on and stops again with pads occupying preferred positions, as shown in FIG. 4. In this preferred stop position of the machine there is a label 2A on the suction drum 14 just upstream of the gumming wheel 16, and the last label 2B to be gummed has been partially applied to a packet 18B on the conveyor 20. All other packets 18 are in the stack 32 above the lifting plunger 30. After a further shod delay drive to the pecker 28, the lifting plunger 30 and the delivery pusher 35 is reinstated, the remaining pads of the machine being disengaged from the drive (e.g. by disengagement of a clutch). The pecker 28 causes the packet 18B carrying the partially applied label 2B to move into position 18C below the stack 32. The lifting plunger 30 then operates to lift the packet into the position 18D, during which movement the lower end of upstream guide 33 serves as a folder so that application of the label is completed by folding it around the corner of the packet, as shown in FIG. 4. At the same time as the plunger 30 lifts the packet into the stack 32 the rotating pusher 35 is operated to remove the uppermost packet from the top of the stack.

No labels or packets are wasted on occurrence of a machine stoppage: the label 2A has not yet been gummed and may remain in position on the drum 14 indefinitely; the last label to be gummed is on the packet in position 18D, which is in the stack 32 so that the label will consequently be held in place until the adhesive has dried and the label has become securely affixed to the packet.

FIG. 5 shows a typical drive arrangement for the machine. A motor 50 is connected by way of a clutch 52 to the input of a first transmission 54, and is also connected to the input of a second transmission 56. The first transmission 54 has one or more outputs 58 from which are driven the drive roll 4, rotary knife 10, suction drum 14, gumming wheel 16, conveyors 20 and 22, and starwheel 24. The second transmission 56 has one or more outputs 60 from which are driven the pecker 28, the plunger 30 and the pusher 35. The transmissions 54 and 56 may include gears, belts and pulleys and/or any other suitable elements for transmitting drive. Further transmission elements (not shown) may be interposed between the outputs 58 and 60 and any or all of the driven elements.

The motor 50 and clutch 52 are controlled by a microprocessor 62 acting through an interface unit 64. Instead of deriving drive from a common motor 50, more than one motor may be employed, up to and including individual motors for each driven element. In such cases a clutch may not be required, the required relative movements of the driven elements being achieved by direct control of the motors (e.g. by the microprocessor 62). In this case, and in the arrangement shown in FIG. 4, the microprocessor 62 receives signals, e.g. on lines 66, 68, relating to the positions of the driven elements. It will be understood that the microprocessor 62 will normally include further signal lines, which are not shown in the drawing, and also control further functions of the machine not all of which are described herein.

I claim:

1. A method of applying labels to articles, including the process steps of feeding adhesive-carrying labels at a first position, conveying labels from said first position through an intermediate region in which successive labels are applied to successive articles, and delivering articles with applied labels to a stabilizing region downstream of said intermediate region, wherein, following a signal to interrupt the process steps, at least one article carrying an applied label is automatically moved from said intermediate region to said stabilizing region while further feed of labels at said first position is inhibited, so that after a predetermined period following said signal no labels with adhesive applied to them remain in said intermediate region.

2. A method as claimed in claim 1, wherein feed of articles into the intermediate region is inhibited following said signal.

3. A method as claimed in claim 2, wherein any article passing through said intermediate region is temporarily halted following said signal, and subsequently moved to a preferred position for removal to said stabilizing region prior to expiry of said predetermined period.

4. A method as claimed in claim 1, further including the step of applying adhesive to or activating adhesive on the labels at said first position.

5. A method as claimed in claim 4, wherein feed of labels towards and from said first position is temporarily halted following said signal, and subsequently any label downstream of said position is applied to an article and carried with it to said stabilizing region within said predetermined period, and any label upstream of said position is moved to a preferred position just upstream of said first position.

6. A method as claimed in claim 1, including the step of forming a stack of articles in said stabilizing region, with at least a portion of each applied label lying between and being maintained in place by successive articles in the stack.

7. A method as claimed in claim 6, wherein a further portion of each label is held against its article during assembly of said stack.

8. A method as claimed in claim 1, further including the steps of feeding labels towards said first position in timed relationship to feed of successive articles, and subjecting each label to a periodically operating engaging and conveying force to feed it forward in a predetermined position.

9. A method as claimed in claim 8, wherein the periodically operating engaging and conveying force comprises a nip force.

10. Apparatus for applying labels to articles, including a label conveyor for feeding adhesive-carrying labels, an article conveyor for conveying articles past said label conveyor so as to receive labels therefrom, delivery means for transferring articles having labels applied to them to a stabilizing region, and control means for controlling movement of said conveyors and said delivery means, including means for inhibiting feed of labels by the label conveyor following a signal to interrupt operation of the apparatus, and means for causing the delivery means to automatically advance any articles with already-applied labels to the stabilizing region within a predetermined period following said signal.

11. Apparatus as claimed in claim 10, including means for applying adhesive to successive labels on the label conveyor, said control means being arranged to inhibit operation of said applying means following said signal.

12. Apparatus as claimed in claim 10, wherein said stabilizing region includes means defining a path for articles in stack formation.

13. Apparatus as claimed in claim 12, wherein the delivery means includes first means for advancing articles from said article conveyor to a position in alignment with said path for articles in stack formation, and second means for advancing articles from said position and along said path.

14. Apparatus as claimed in claim 13, wherein said article conveyor is arranged to convey articles in a substantially horizontal direction, wherein said first means comprises a member pivoted about a substantially horizontal axis and having a pusher which engages an article and removes it from said conveyor in said direction.

15. Apparatus as claimed in claim 14, wherein said second means comprises means for receiving each successive article from said first means and for transferring it in a substantially vertical direction to said stabilizing region.

16. Apparatus as claimed in claim 12, including means synchronised with said delivery means for removing articles from the stabilizing region at an end thereof remote from said delivery means.

17. Apparatus as claimed in claim 10, including a further conveyor cooperating with said label conveyor and carrying periodically operating means for engaging each successive label to advance it on said label conveyor in a predetermined position.

18. Apparatus as claimed in claim 17, wherein said label conveyor comprises a suction drum, said further conveyor comprises a further drum, and said periodically operating means comprises a wheel carried by said further drum near its periphery and subject to means urging it in a radially-outer direction.

19. Apparatus for applying labels to articles, comprising means for feeding a web of label material, means for severing successive leading ends of the web to form labels, a suction drum for receiving labels from said severing means and for conveying them towards a station at which the labels are applied to said articles, and a further drum cooperating with said suction drum and carrying periodically operating means for engaging a leading part of each successive label severed from the web and for causing it to be subsequently conveyed on said suction drum in a predetermined position.

20. Apparatus as claimed in claim 19, wherein the periodically operating means cooperates with said suction drum to grip each label and comprises a wheel carried by said further drum near its periphery and subject to means urging it in a radially-outer direction.

21. Apparatus as claimed in claim 19, wherein the further drum comprises a rotary knife drum forming part of said severing means.

22. Apparatus as claimed in claim 21, wherein the rotary knife drum cooperates with a stationary counter knife and means is provided to prevent interference between the periodically operating means and the counter knife.

23. Apparatus as claimed in claim 22, wherein the means preventing interference comprises part of a stationary cam surface.

24. Apparatus as claimed in claim 19, wherein the periodically operating means comprises an engagement member carried by said drum near its periphery, resilient means for urging said engagement member in a radially-outer direction, and means for allowing said resilient means to urge said engagement member outwards at rotational positions of said further drum corresponding to opposition of said engagement member with said suction drum.

25. Apparatus as claimed in claim 24, wherein said allowing means comprises means arranged to resist said resilient means at other rotational positions of said further drum.

26. Apparatus as claimed in claim 25, wherein said means arranged to resist said resilient means comprises a stationary cam surface.

* * * * *